United States Patent
Folchert

[19]

[11] Patent Number: 6,098,967
[45] Date of Patent: Aug. 8, 2000

[54] LEVEL CONTROL ARRANGEMENT FOR VEHICLES HAVING AIR SPRINGS

[75] Inventor: Uwe Folchert, Gehrden, Germany

[73] Assignee: Continental Aktiengesellschaft, Hannover, Germany

[21] Appl. No.: 09/094,399

[22] Filed: Jun. 10, 1998

[30] Foreign Application Priority Data

Jun. 12, 1997 [DE] Germany ............................ 197 24 747

[51] Int. Cl.[7] ............................................. F16F 5/00
[52] U.S. Cl. .................................... 267/64.16; 267/64.11
[58] Field of Search ............................. 280/6.157, 6.158, 280/6.159, 124.16; 267/64.16, 64.17, 64.28, DIG. 1, 123, 64.11; 188/195

[56] References Cited

U.S. PATENT DOCUMENTS

| | | |
|---|---|---|
| 4,465,297 | 8/1984 | Yamahara . |
| 4,809,957 | 3/1989 | Schonfeld et al. . |
| 5,048,867 | 9/1991 | Gradet .................................. 280/6.159 |
| 5,176,404 | 1/1993 | Sulzyc ............................... 280/124.138 |
| 5,342,023 | 8/1994 | Kuriki et al. ......................... 267/64.17 |
| 5,452,919 | 9/1995 | Hoyle et al. .......................... 280/6.158 |

FOREIGN PATENT DOCUMENTS

| | | |
|---|---|---|
| 0224663 | 6/1987 | European Pat. Off. . |
| 3919438 | 12/1990 | Germany . |
| 195 28 852 | 2/1997 | Germany . |
| 55055012 | 4/1980 | Japan . |
| WO/93/05972 | 4/1993 | WIPO . |

*Primary Examiner*—Robert J. Oberleitner
*Assistant Examiner*—Thomas J. Williams
*Attorney, Agent, or Firm*—Walter Ottesen

[57] ABSTRACT

The invention is directed to a level control arrangement for a vehicle having air springs (8) via which the vehicle is suspended relative to at least one vehicle axle. Directional valve (18) conducts moist air and is configured as a pneumatically controllable valve in order to prevent icing thereof. For controlling or switching, directional valve (18) is charged via the control line (22) with pressurized air generated by the compressor (4). The control line (22) can be connected via a third directional valve (20) to the atmosphere so that, when the compressor (4) is not running, the second directional valve (18) can transfer from a switching state wherein the compressor (4) is connected to the air dryer (6) into an other switching state wherein the air dryer (6) is connected to the atmosphere.

6 Claims, 3 Drawing Sheets

LEVEL CONTROL ARRANGEMENT FOR VEHICLES HAVING AIR SPRINGS

FIELD OF THE INVENTION

The invention relates to a level control arrangement for vehicles having air springs which suspend a vehicle chassis relative to at least one vehicle axle. Each air spring can be connected to a pressurized air source for filling via an air dryer and a check valve which opens toward the air spring. For discharging, each air spring can be connected to the atmosphere via a first drivable control valve and the air dryer.

BACKGROUND OF THE INVENTION

A level control arrangement of this kind for vehicles equipped with air springs is, for example, disclosed in U.S. Pat. No. 4,465,297. For filling the air spring, the air spring is connected to a pressurized air source via an air dryer, a check valve and an electrically drivable first control valve. The air dryer is operated in the drying mode of operation when filling the air spring. To discharge the air spring, the latter is connected to the atmosphere via the first electrically drivable control valve, a throttle, the air dryer and a second electrically drivable control valve. When discharging the air spring, the air dryer is operated in the regeneration mode of operation. For this reason, the air, which is conducted via the second electrically drivable control valve into the atmosphere, has a high air humidity so that the second electrically drivable valve tends to ice at low temperatures. If icing of the second electrically drivable valve takes place, then this valve can no longer be switched because the switching forces of an electrically drivable control valve are not sufficiently large in order to break loose an iced valve. In this case, the level control arrangement therefore is continuously connected to the atmosphere via the second electrically drivable control valve so that the air spring can no longer be filled with air with the aid of the pressurized air source because the pressurized air, which is generated by the pressurized air source, immediately escapes into the atmosphere.

SUMMARY OF THE INVENTION

It is an object of the invention to provide a level control arrangement for vehicles equipped with air springs which remains operational even at low ambient temperatures at which a danger of icing is present.

The level control arrangement of the invention is for vehicles having an air spring for suspending the vehicle chassis relative to at least one vehicle axle. The level control arrangement includes: a pressure source for generating pressurized air; an air drier for removing moisture from the air; a check valve connecting the air drier to the air spring so as to allow pressurized air to flow to the air spring from the air drier; a first controllable directional valve switchable between a first position wherein the first controllable directional valve connects the air spring to the atmosphere via the air drier and a second position wherein the connection to the atmosphere is blocked; a second controllable directional valve having a control input and being connected between the pressure source and the air drier; a control line for connecting the control input to the pressure source; the second controllable directional valve being a pneumatically controllable valve and being switchable between a first position wherein atmospheric air pressure is applied to the input and the second controllable directional valve connects the air drier to the atmosphere and a second position wherein pressurized air is supplied to the input and the second controllable directional valve connects the pressure source to the air drier whereby pressurized air flows through the second controllable valve to the air drier; a third controllable directional valve switchable between a first position wherein the control line is disconnected from the atmosphere and a second position wherein the control line is connected to the atmosphere; and, a control apparatus operatively connected to the pressure source and the controllable directional valves.

Moist air from the air spring is conducted into the atmosphere via the drivable directional control valve or moist air from the pressurized air source is conducted into the air dryer via this valve. The basic idea of the invention is that this drivable directional control valve is pneumatically controlled by the pressurized air generated by the pressurized air source.

The advantages achieved with the invention are especially that the pneumatically controllable second directional valve can be provided with a large flow cross section and therefore exhibits a reduced tendency to ice. A further advantage of the invention is that the control line of the pneumatically controllable second directional valve is deliberately charged with the pressurized air generated by the pressurized air source. In this way, it is possible to generate, at least for a short time, the air pressure on the control line of the pneumatically drivable second directional valve which is necessary to switch this valve. If the valve is iced notwithstanding the large flow cross section, then the control line of the pneumatically controllable second directional valve can be charged for a short time with a very high air pressure in order to break it loose.

According to a first embodiment of the invention, the third directional valve is configured as an electrically controllable directional valve. Such an embodiment of the third directional valve is possible even though moist air is conducted via the third directional valve because the air quantity, which is conducted by this valve, is so small that icing of the third directional valve is virtually precluded.

According to an alternate embodiment of the invention, the third directional valve is configured as a pneumatically controllable directional valve. The advantage of this embodiment is that high switching forces can be generated also at the third directional valve so that this directional valve can still be switched even if it becomes iced unexpectedly.

The pneumatically drivable third directional valve can have two pneumatically drivable control inputs. In a first switching state of the third directional valve, pressurized air generated by the pressurized air source is applied to a first control input and pressurized air is applied to the second control input which is less than the pressurized air generated by the pressurized air source. The third directional valve then blocks the connection of the control line of the second direction valve to the atmosphere. In a second switching state of the third directional valve, the same air pressure is applied to the first control input and to the second control input. The third directional valve then opens the connection of the control line of the second directional valve to the atmosphere.

According to another embodiment of the invention, the control line, which leads to the control input of the second directional valve, can be connected to the atmosphere in a third switching state of the second control valve when air pressure at a specific level is generated by the pressurized air source. The advantage of this further embodiment is that the control line (for a specific air pressure which is supplied by the pressurized air source) is automatically connected to the atmosphere. In this way, the pressurized air source is prevented from being overloaded when a high air pressure is generated by the pressurized air source and the air spring can nonetheless not be filled with the generated air because the air pressure present there is still greater than the air pressure generated by the pressurized air source.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
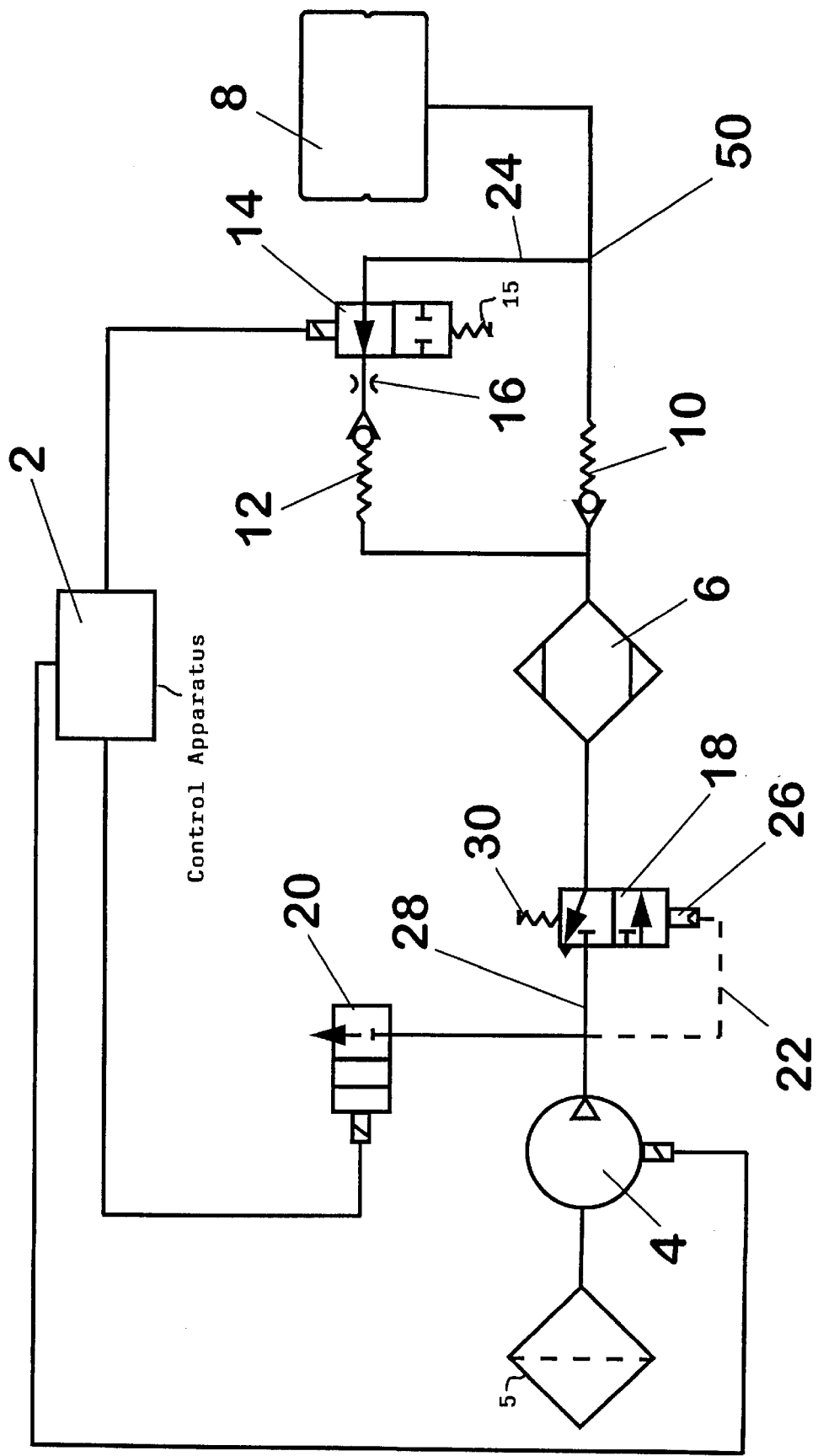
FIG. 1 is a schematic of a level control arrangement according to an embodiment of the invention.

FIG. 1 is a schematic representation of a level control arrangement for a motor vehicle having an air spring 8. The directional valves (14, 18, 20) are so switched that the air spring 8 is discharged. From the air spring 8, air reaches the air dryer 6 via the first electrically drivable directional valve 14, the throttle 16 and the check valve 12 which opens toward the air dryer 6. The air dryer 6 is operated in the regeneration mode during discharge of the air spring 8. From the air dryer 6, the air reaches the atmosphere via the pneumatically controllable second directional valve 18. If the air spring 8 is not to be discharged further, then the control apparatus 2 switches the control input of the electrically controllable first directional valve 14 so that no current is supplied. In this way, the return spring 15 transfers the directional valve 14 into the base position and thereby blocks the line 24.

If, at a later time point, the air spring 8 is to be charged, then the control apparatus 2 controls the compressor 4 so that the latter begins to operate. As a consequence, the control line 22 and the control input 26 of the pneumatically controllable second directional valve 18 is charged with pressurized air so that the second directional valve is transferred from the switching state shown in FIG. 1 to the other switching state and the line 28 is switched through. The line 28 now connects compressor 4 to the air dryer 6 and air can be pumped into the air spring 8 from the compressor 4 via the air dryer 6 and the check valve 10 which is opened to the air spring 8. The compressor 4 is provided with an air filter 5 to clean the air to be pressurized.

If the charging operation is to be ended, then the control apparatus 2 controls the compressor 4 so that the latter ceases to operate. Furthermore, the control apparatus 2 controls the control input of the electrically controllable third directional valve 20 so that the latter is transferred from the switching state shown in FIG. 1 into the other switching state. The control line 22 of the pneumatically controllable second directional valve 18 is then connected via the third directional valve 20 to the atmosphere so that the pressure at the control input 26 drops and the second directional valve 18 is switched back into the switching state shown in FIG. 1 by the return spring 30. The air spring 8 can again be discharged by transferring the first directional valve 14 from the base position into the position shown in FIG. 1 by the control apparatus 2.

The second directional valve 18 is configured as a pneumatically controllable directional valve. For this reason, the second directional valve 18 has a high flow cross section and therefore exhibits a low tendency to ice. Furthermore, high switching forces can be generated via the control line 22 and the control input 26 with the aid of compressor 4. In this way, the directional valve 18 can be transferred from the switching state shown in FIG. 1 to the other switching state even when it is iced because of the moist air which is conducted through this valve.

According to an alternate embodiment, the first directional valve 14 can also be arranged between the air spring 8 and point 50. An arrangement of this kind affords the advantage that, in the base position of the first directional valve 14, no air escapes from the air spring 8 via a possible leak in the check valve 10.

Figure 2:
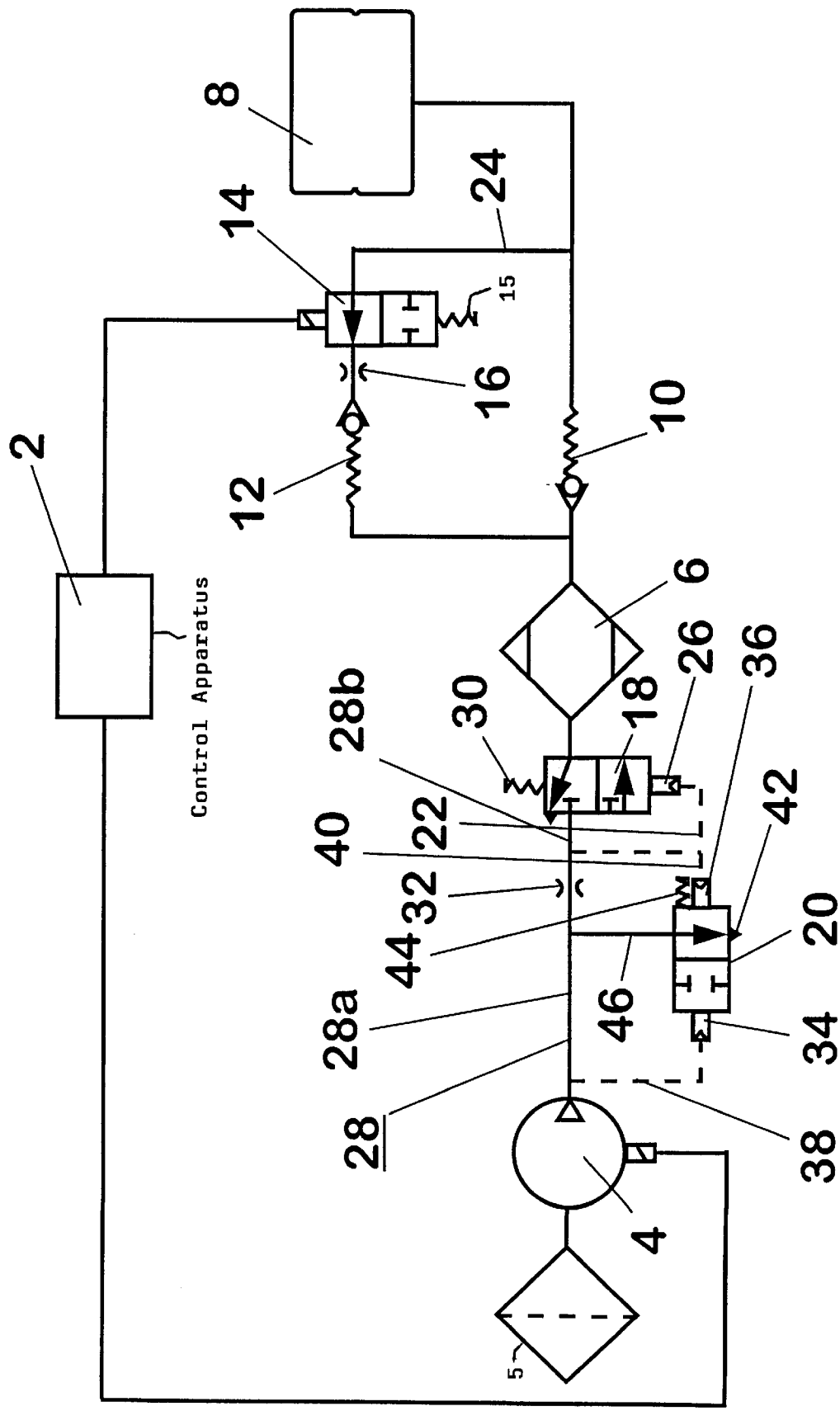
FIG. 2 is a schematic of a second embodiment of the level control arrangement of the invention; and, FIG. 3 is a schematic of the second directional valve utilized in the embodiments of FIGS. 1 and 2.

FIG. 2 shows a level control arrangement for a vehicle with an air spring 8. The level control arrangement of FIG. 2 is configured substantially the same as the level control arrangement of FIG. 1. Only the assembly between the compressor 4 and the pneumatically controllable second directional valve 18 is different.

In the level control arrangement of FIG. 2, the directional valves (14, 18, 20) are again in a position in which the air spring 8 can be discharged into the atmosphere. The air path here is the same as already described in connection with the arrangement of FIG. 1. If the air spring 8 is not to be further discharged, then the control apparatus 2 switches the control input of directional valve 14 so that no current is present. The return spring 15 then transfers the directional valve 14 into the base position and thereby blocks line 24.

To fill the air spring, the compressor 4 is driven by the control apparatus 2 and thereupon starts to run. The pressurized air, which is generated by the compressor 4, is first conducted into the line 28. Because of the throttle 32, a greater air pressure results in the line segment 28a forward of the throttle 32 than in the line segment 28b rearward of the throttle 32. In the control line 38 of the third directional valve 20, the same air pressure occurs as in the line segment 28a and, in the control line 40 of the third directional valve 20, the same air pressure occurs as in the line segment 28b. As a consequence of the pressure gradient, the pneumatically controllable third directional valve 20 is transferred from the switching state shown in FIG. 2 into the other switching state via the air pressure present at the control input 34 so that the output 42 is blocked to the atmosphere. The pneumatically controllable second directional valve 18 is transferred from the switching state shown in FIG. 2 into the other switching state via the air pressure present in the control line 22 of this second directional valve 18 so that the line 28 is clear from the compressor 4 to the air dryer 6 and pressurized air can be conducted to the air spring 8 via the check valve 10.

If the charging operation is to be ended, then compressor 4 is again driven by the control unit 2 so that the compressor stops running. As soon as the compressor 4 has stopped running, a pressure equilibrium develops in the line 28 so that the same air pressure is present also in the control lines 38 and 40 of the pneumatically controllable third directional valve 20. In this case, the third directional valve 20 is again transferred into the switching state shown in FIG. 2 via the control input 36 and with the aid of the return spring 44. The control line 22 is then connected to the atmosphere via the throttle 32, the line 46 and the third directional valve 20. The pneumatically controllable second directional valve 18 is transferred again into the switching state shown in FIG. 2 because of the return force which is developed by the spring 30 so that the level control arrangement is again ready for a renewed discharge or for a renewed charging of the air spring 8.

Figure 3:
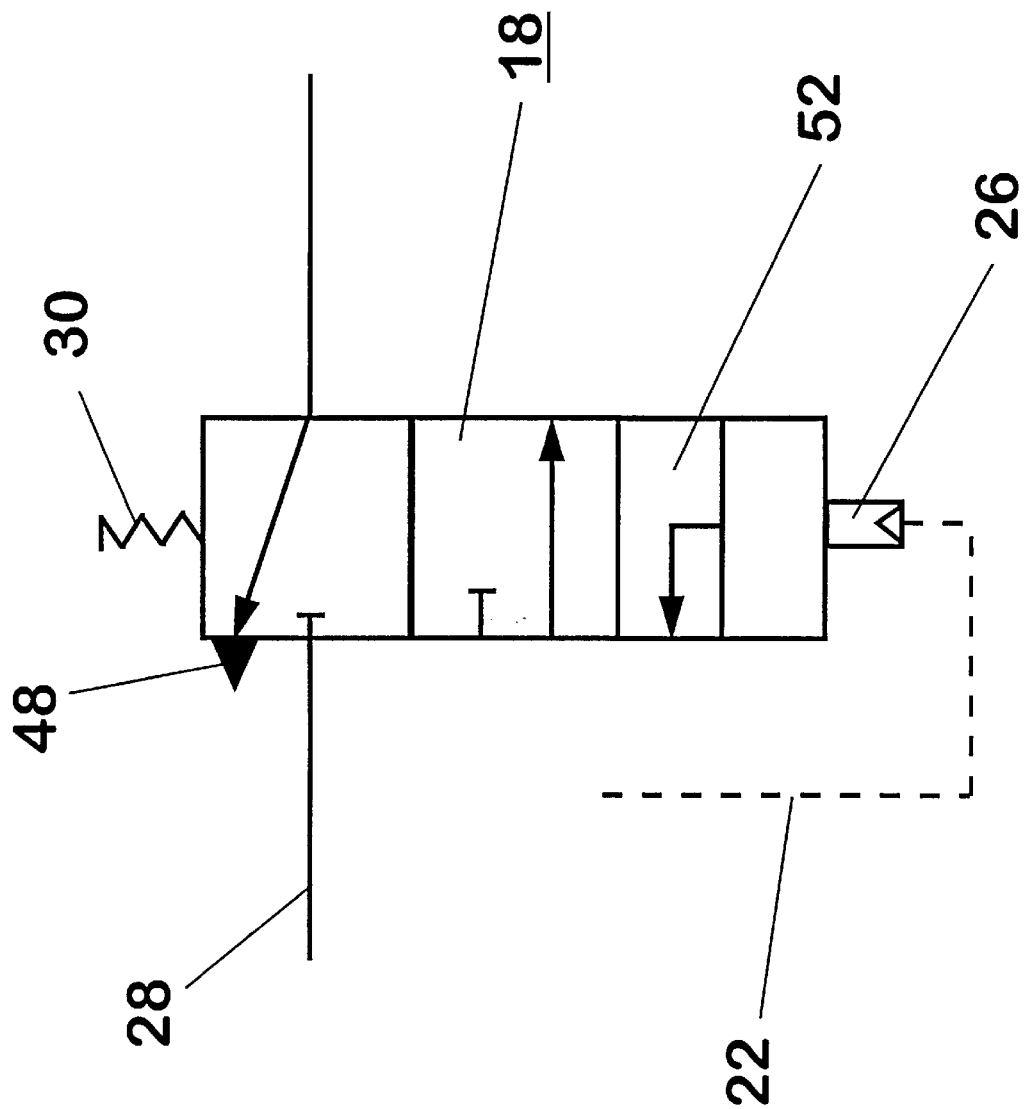

FIG. 3 shows a second directional valve 18 which is configured in the same way as the directional valve 18 shown in FIGS. 1 and 2. However, here, the directional valve 18 can be switched into a third switching state indicated by reference numeral 52. With the aid of this third switching state, the level control arrangement can be protected against overloading as will be explained below.

If a high air pressure is already present in the air spring 8 of the level control arrangement and a command is nonetheless emitted by the control apparatus 2 to continue filling the air spring 8 (for example, because a passenger car is too greatly loaded and the chassis of the vehicle has dropped down too much as a consequence thereof), then the compressor 4 starts to run in order to pump air into the air spring 8. This, however, is only possible when the pressurized air, which is generated by the compressor 4, has a higher air pressure than the air pressure present in the air spring 8. If this cannot be provided by the compressor 4 even at its maximum power output, then the danger is present that the compressor 4 will be overloaded. To avoid this danger, the second directional valve 18 is switched into the third switching state when there is a maximum power output of the compressor 4 wherein the maximum air pressure, which can be generated, is present at the control input 26. In this switching state, the control line 22 as well as the air spring 8 are connected via the output 48 to the atmosphere so that, on the one hand, the compressor 4 is relieved of load and, on the other hand, the air spring 8 is relieved of load. An overloading of the compressor 4 and the air spring 8 as a consequence of a loading of the vehicle which is too high is thereby precluded.

It is understood that the foregoing description is that of the preferred embodiments of the invention and that various changes and modifications may be made thereto without departing from the spirit and scope of the invention as defined in the appended claims.

What is claimed is:

1. A level control arrangement for vehicles having an air spring for suspending the vehicle chassis relative to at least one vehicle axle, the level control arrangement comprising:

a pressure source for generating pressurized air;

an air drier for removing moisture from the air;

a check valve connecting said air drier to said air spring so as to allow pressurized air to flow to said air spring from said air drier;

a first controllable directional valve switchable between a first position wherein said first controllable directional valve connects said air spring to the atmosphere via said air drier and a second position wherein the connection to the atmosphere is blocked;

a second controllable directional valve having a control input and being connected between said pressure source and said air drier;

a control line for connecting said control input to said pressure source;

said second controllable directional valve being a pneumatically controllable valve and being switchable between a first position wherein atmospheric air pressure is applied to said input and said second controllable directional valve connects said air drier to the atmosphere and a second position wherein pressurized air is supplied to said input and said second controllable directional valve connects said pressure source to said air drier whereby pressurized air flows through said second controllable valve to said air drier;

a third controllable directional valve switchable between a first position wherein said control line is disconnected from the atmosphere and a second position wherein said control line is connected to the atmosphere;

a control apparatus operatively connected to said pressure source and said first and third controllable directional valves; and, said second controllable directional valve being operatively connected to said pressure source.

2. The level control arrangement of claim 1, said third controllable directional valve being an electrically controllable valve.

3. The level control arrangement of claim 1, wherein: said second controllable directional valve has three positions; and, said control line is connected to the atmosphere when said second controllable directional valve is in the third position and when an air pressure at specific magnitude is generated by said pressure source.

4. A level control arrangement for vehicles having an air spring for suspending the vehicle chassis relative to at least one vehicle axle, the level control arrangement comprising:

a pressure source for generating pressurized air;

an air drier for removing moisture from the air;

a check valve connecting said air drier to said air spring so as to allow pressurized air to flow to said air spring from said air drier;

a first controllable directional valve switchable between a first position wherein said first controllable directional valve connects said air spring to the atmosphere via said air drier and a second position wherein the connection to the atmosphere is blocked;

a second controllable directional valve having a control input and being connected between said pressure source and said air drier;

a control line for connecting said control input to said pressure source;

said second controllable directional valve being a pneumatically controllable valve and being switchable between a first position wherein atmospheric air pressure is applied to said input and said second controllable directional valve connects said air drier to the atmosphere and a second position wherein pressurized air is supplied to said input and said second controllable directional valve connects said pressure source to said air drier whereby pressurized air flows through said second controllable valve to said air drier;

a third controllable directional valve switchable between a first position wherein said control line is disconnected from the atmosphere and a second position wherein said control line is connected to the atmosphere;

a control apparatus operatively connected to said pressure source and said first controllable directional valve; and, said second and third controllable directional valves being operatively connected to said pressure source.

5. The level control arrangement of claim 4, further comprising:

reducing means for providing pressurized air at a pressure lower than the pressure of said pressurized air generated by said pressure source;

said third controllable directional valve being a pneumatically controllable valve having pneumatically controllable first and second inputs;

said first input being connected to said pressure source so as to permit said pressurized air to be applied to said first input when said third controllable directional valve is in said first position;

said second input being connected to said reducing means so as to permit pressurized air at the lower pressure to be applied to said second input also when said third controllable directional valve is in said first position whereby said third controllable directional valve blocks the connection of said control line to the atmosphere; and, said reducing means being connected to said pressure source so as to cause the air supplied to said first and second inputs to be at the same pressure in said second position of said third controllable directional valve whereby said third controllable directional valve opens said control line to the atmosphere.

6. The level control arrangement of claim 4, wherein: said second controllable directional valve has three positions; and, said control line is connected to the atmosphere when said second controllable directional valve is in the third position and when an air pressure at specific magnitude is generated by said pressure source.

* * * * *